Jan. 11, 1966 L. M. GREEP ET AL 3,229,150

FLYBACK DRIVEN DEFLECTION CIRCUIT

Filed Aug. 6, 1962 6 Sheets-Sheet 1

INVENTOR
LEONARDUS M. GREEP
TEUNIS POORTER
BY
Frank R. Jifani
AGENT

Jan. 11, 1966 L. M. GREEP ET AL 3,229,150

FLYBACK DRIVEN DEFLECTION CIRCUIT

Filed Aug. 6, 1962 6 Sheets-Sheet 2

INVENTOR
LEONARDUS M. GREEP
TEUNIS POORTER,
BY
Frank R. Jerfani
AGENT

FLYBACK DRIVEN DEFLECTION CIRCUIT

Filed Aug. 6, 1962

INVENTOR
LEONARDUS M. GREEP
TEUNIS POORTER
BY
Frank R. Jeffrey
AGENT

INVENTOR
LEONARDUS M. GREEP
TEUNIS POORTER
BY
AGENT

INVENTOR
LEONARDUS M. GREEP
TEUNIS POORTER
BY
Frank R. Trifari
AGENT

Jan. 11, 1966 L. M. GREEP ET AL 3,229,150

FLYBACK DRIVEN DEFLECTION CIRCUIT

Filed Aug. 6, 1962 6 Sheets-Sheet 6

INVENTOR
LEONARDUS M. GREEP
TEUNIS POORTER
BY
AGENT

United States Patent Office 3,229,150

Patented Jan. 11, 1966

3,229,150

FLYBACK DRIVEN DEFLECTION CIRCUIT

Leonardus Maria Greep and Teunis Poorter, both of Emmasingel, Eindhoven, Netherlands, assignors to North American Philips Company, Inc., New York, N.Y., a corporation of Delaware Filed Aug. 6, 1962, Ser. No. 215,093

Claims priority, application Netherlands, Aug. 17, 1961, 268,351

7 Claims. (Cl. 315—27)

This invention relates to flyback driven time base circuit arrangements of the kind employing a semi-conducting switching element wherein a sawtooth current is generated in a cathode-ray tube deflection coil during the non-conductive state of said switching device and wherein energy is stored in the output circuit of said switching element during the flyback time of the sawtooth current, at which time said switching element is conductive, said energy being fed back through a second switching element, preferably a semi-conductor diode, to the supply source during the said non-conductive state.

Time bases of the kind set forth have been described in U.S. Patent 2,995,679 and it is an object of the invention to include means in said time-base arrangement to ensure that after the flyback has been completed the current through the switching element is taken over gradually by a recovery diode included in the arrangement.

Such, so-called, flyback-driven circuit arrangements produce a sawtooth current through a coil and comprise a D.C. voltage source, a supply impedance, a capacitor, a transformer to which the coil is coupled, a switching element and a recovery diode, in which a charging current supplied from the D.C. voltage source to the capacitor via the supply impedance accumulates electrical energy in said capacitor and in which the switching device is rendered conducting during the flyback of the sawtooth current by means of a control signal. As a result, the electrical energy accumulated in the capacitor is converted into a current through the switching element and hence into magnetic energy to be stored in the field of the transformer and the coil, and in which the recovery diode coupled to the transformer is automatically rendered conductive during the stroke period of the sawtooth current by the circulated energy, and means are present to cut off the switching element, as a result of which the magnetic energy stored in the field may flow back to the D.C. voltage source as a current through the recovery diode.

When replacing tubes by transistors and similar semi-conductor devices in deflection circuits there occurs the problem of switching them off. In the case of a transistor, for example, the so-called storage effect occurs (holes in a p-n-p-transistor and electrons in a n-p-n-transistor), as a result of which, if the transistor was conductive, when first switching off, the concentration of the minority carriers in the base region has to be removed before the collector current is reduced to zero.

The circuit arrangement disclosed in U.S. Patent 2,995,679 has the advantage that the transistor is not conductive during the stroke period as is the case in the conventional circuits, but only during the flyback-period of the sawtooth current to be produced. Because of this fact it becomes possible to cause the recovery diode to be conductive during the stroke and the transistor conductive during the flyback, so that they may take over one another's current.

If, however, the current-voltage characteristics are considered as a function of the time for such a circuit arrangement, it appears, as will be explained hereafter, that the taking-over of the current by the recovery diode has to occur rather abruptly because otherwise insufficient sawtooth current is obtained at the beginning of the stroke period.

It is an object of the present invention to provide means to cause the take-over of current to occur gradually without disturbing the flyback period.

In order to realize this, the circuit arrangement according to the invention is characterized in that, in order gradually to decrease the current through the switching device and gradually to increase the current through the recovery diode after termination of the flyback, an overswing coil is included in series with the switching element and in that part of the circuit which also includes the capacitor.

In addition, the circuit may be made less critical insofar as its control of the switching device is concerned if, in a further embodiment of the circuit arrangement in accordance with the invention, the switching device comprises a silicon-controlled rectifier, hereinafter referred to as an "SCR." In this embodiment, a control signal is supplied between the base and the emitter in the form of short pulses which cause the SCR to become conductive at the beginning of the flyback and to be cut off by a voltage between the collector and the emitter of the SCR derived from the overswing coil during the beginning of the stroke. During the stroke period, the base-emitter voltage of the SCR is kept at a value by the control signal such that in co-operation with the frequency-determining elements in the collector-emitter circuit of the SCR it is ensured that, after cutting off, the SCR remains cut off during the stroke.

In order that the invention may readily be carried into effect, various embodiments of the flyback-driven circuit arrangement in accordance with the invention will now be described, by way of example, with reference to the accompanying drawings, in which.

Figure 7A:
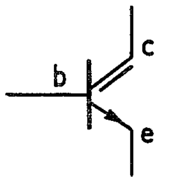
FIGURE 7 is a circuit arrangement according to the invention in which an SCR is used as the switching device.
Figure 7B:
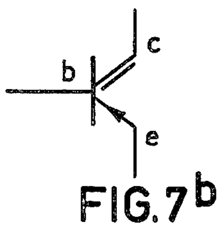
Figure 8:
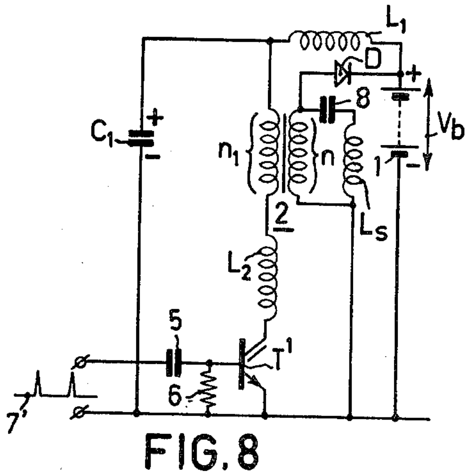
Figure 9:
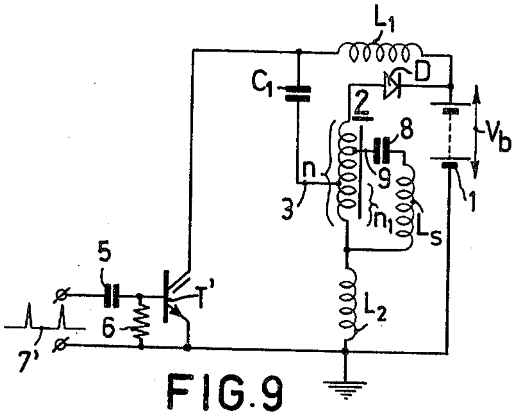
Figure 10:
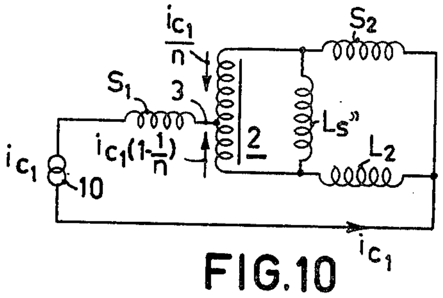
Figure 11:
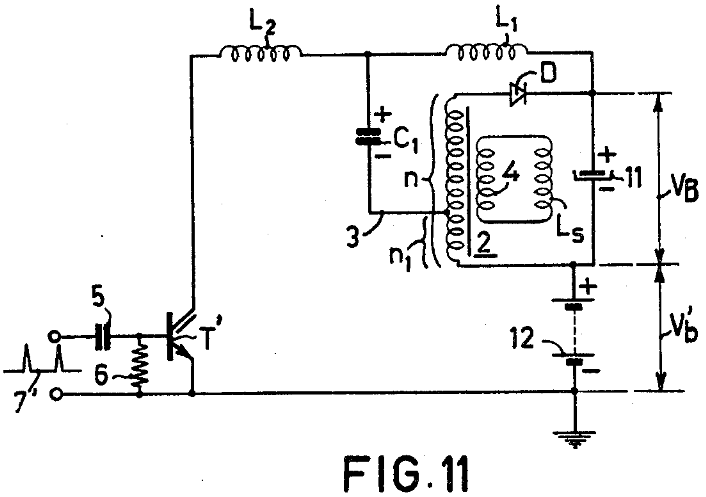

FIGURE 7*a* shows the symbol for a n-p-n-p SCR and FIGURE 7*b* the symbol for a p-n-p-n SCR;

FIGURE 8 is a further embodiment in which the various elements are connected in a somewhat different sequence;

FIGURE 9 shows an embodiment in which the overswing coil also compensates for the influence of the leakage inductance present in the transformer in as far as the distortion of the generated sawtooth current is concerned;

FIGURE 10 is a partial equivalent circuit diagram of the circuit arrangement shown in FIGURE 9, and FIGURE 11 is an embodiment in which a capacitor serving as the auxiliary D.C. voltage source is provided.

Figure 1:
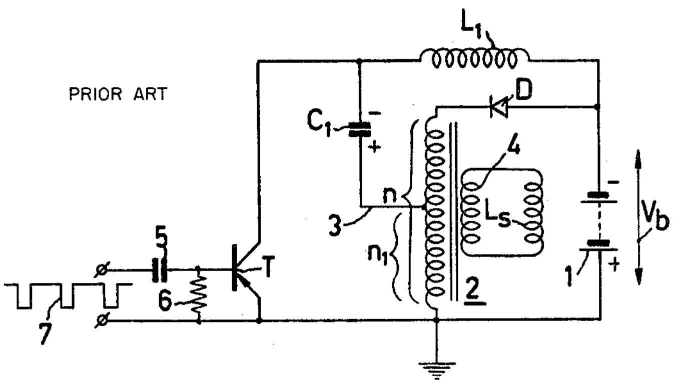
FIGURE 1 is the known circuit arrangement in a somewhat modified form.

FIGURE 1 shows in a somewhat modified form the circuit arrangement described in U.S. Patent 2,995,679 in which an autotransformer is used instead of a normal transformer. In FIGURE 1, the source 1 is a D.C. voltage source giving a supply voltage of $V_b$ volts. The negative terminal of the source 1 is connected to the collector of a pnp-transistor T via a supply coil $L_1$, and the emitter is connected to the positive terminal of the source 1. In addition, the negative terminal of the source 1 is connected to the anode of a recovery diode D, the cathode of which is connected to the positive terminal of the source 1 through a winding of the transformer 2. The positive terminal is also connected to earth.

Between the cathode of the diode D and earth a number of turns $n$ of the said winding of transformer 2 are available and at $n_1$ turns a tapping 3 is provided so that the portion between the tapping 3 and earth has $n_1$ turns. The portion between the tapping 3 and earth may be considered as the primary and the portion between the cathode of the diode D and earth as the secondary of the transformer 2. The said transformer also includes a tertiary winding 4, with which the cathode ray deflection coil $L_s$ is inductively coupled to the rest of the circuit. A capacitor $C_1$ is provided between the tapping 3 and the junction of the supply coil $L_1$ with the collector of the transistor T.

The deflection coil $L_s$ may be arranged on the neck of a television picture tube in a television receiver or around the neck of a camera tube in a television camera. In these examples the sawtooth current flowing through the coil $L_s$ will generally serve for the horizontal deflection of the electron beam. It is within the scope of the invention to employ the deflection coil for magnetically deflecting the electron beam in a cathode-ray tube used in a cathode-ray oscillograph or for radar and like display purposes.

It will also be understood that if a npn-transistor is used instead of a pnp-transistor, the polarity of the source 1 and the connections to the diode D shall be reversed.

A pulsatory control signal 7 is applied between the base and the emitter of transistor T through capacitor 5 and resistor 6. The signal 7 is such that the transistor T is cut off during the stroke period and released during the flyback-period of the sawtooth current to be produced through the deflection coil $L_s$.

Figure 2:
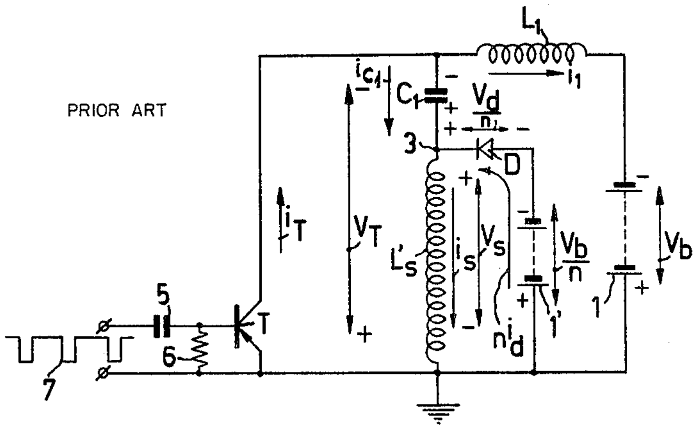
FIGURE 2 is an equivalent circuit diagram of the circuit arrangement shown in FIGURE 1.

In order to demonstrate the variation of the currents and voltages as a function of time in the circuit arrangement shown in FIGURE 1, FIGURE 2 shows the equivalent circuit diagram of the circuit arrangement of FIGURE 1. In FIGURE 2 the number of turns $n_1$ is, for convenience, assumed to equal unity and the deflection coil $L_s$ and the diode D are transformed to the tapping 3. The coil $L_s$ is replaced by coil $L'_s$, the anode of the diode D is connected to a D.C. voltage source 1' assumed to be an auxiliary source which supplies a direct voltage of $V_b/n$ volts. A current $n.i_d$ flows through the diode D which is $n$ times greater than the current $i_d$ which will flow in the circuit of FIGURE 1. A current $i_T$ flows through the transistor T, a current $i_1$ through the supply coil $L_1$, a current $i_{C_1}$ through the capacitor $C_1$ and a current $i_s$ through the transformed deflection coil $L'_s$. The voltage across the coil $L'_s$ is indicated by $V_s$, the voltage across the transformed diode D by $V_d/n$ and that across the transistor T by $V_T$.

Figure 3:
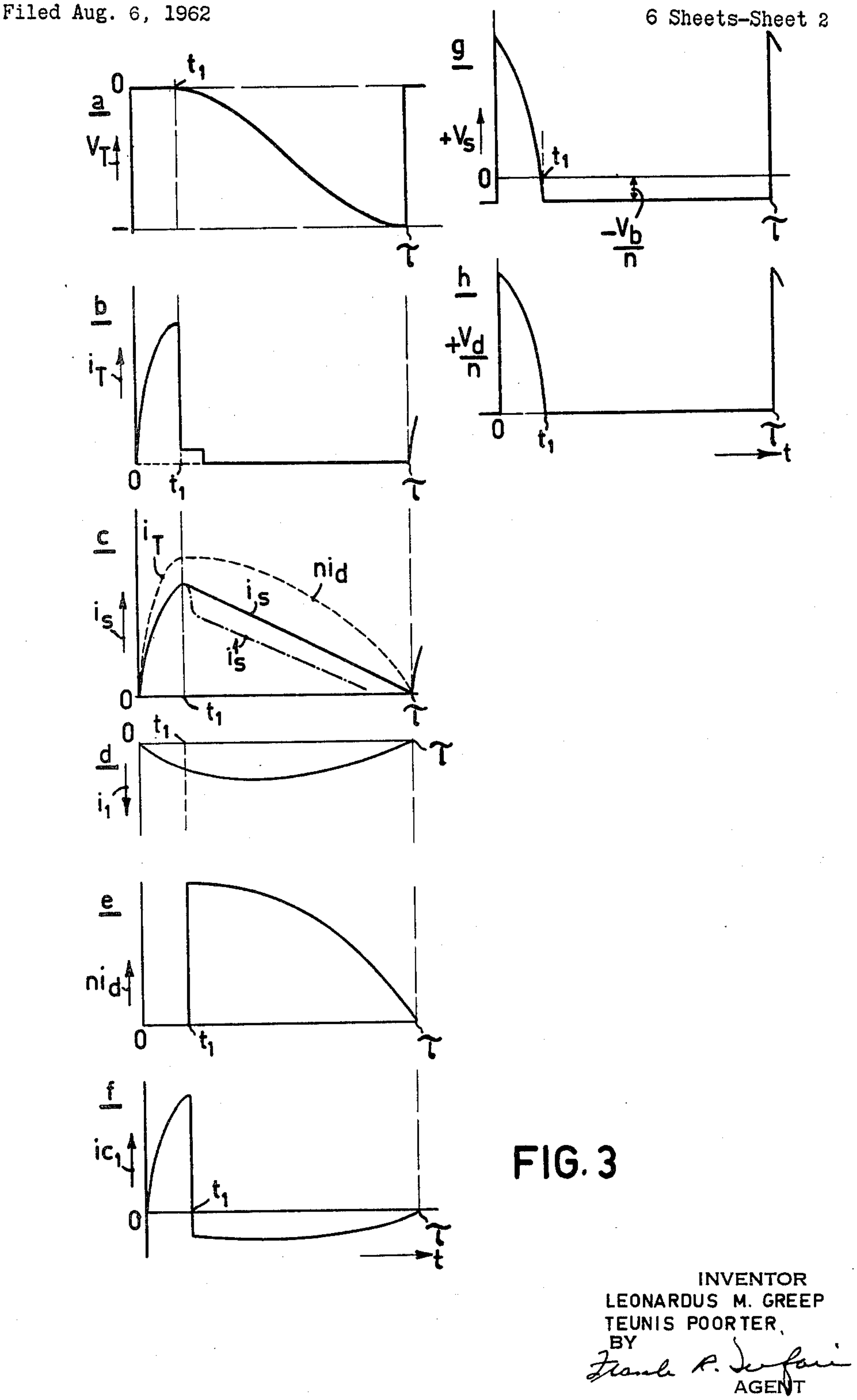
FIGURE 3 shows the currents and voltages as a function of time for the circuit shown in FIGURE 1 with reference to the equivalent circuit diagram shown in FIGURE 2.

The variation of the currents and voltages as a function of the time is shown in FIGURE 3 for one cycle $\tau$ of the sawtooth current $I_s$ through the coil $L'_s$. The period $\tau$ may be divided into a portion 0 to $t_1$, defined as the flyback period, and a portion $t_1$ to $\tau$, defined as the stroke period.

It is assumed that the starting phenomenon has already terminated at the instant $t=0$ and at that instant a quantity of charge is present in the capacitor $C_1$, as a result of which the plates connected to the coil $L'_s$ are positive with respect to the plates connected to the supply coil $L_1$. In addition it is assumed that at $t=0$ the current $i_1$ just equals zero, which condition may be established by suitable choice of the inductance values of the coil $L_1$ and $L'_s$ and of the capacitance value of the capacitor $C_1$.

If at the instant $t=0$ the transistor T is made conductive by the signal 7, the capacitor $C_1$ is connected in parallel with the coil $L'_s$ and the coil $L_1$ in parallel with the source 1. Since the voltage $V_{C_1}$ across the capacitor $C_1$ is equal to the voltage $V_s$ across the coil $L'_s$ and this voltage is much greater than, and of opposite polarity to the voltage $V_b/n$ of the auxiliary source 1', the diode D is cut off (see FIGURES 3*g* and 3*h*). Therefore, the capacitor $C_1$ may discharge sinusoidally through the coil $L'_s$, so that a current $i_{C_1}=i_s$ is formed as shown in FIGURES 3*c* and 3*f*. At the same time a substantially linearly increasing current $i_1$ commences to flow through the supply coil $L_1$ as shown in FIGURE 3*d*. The total current $i_T$ through the transistor T is given by $i_T=i_1+i_s$ and is shown in FIGURE 3*b*.

The discharge of the capacitor $C_1$ lasts somewhat longer than ¼ of a period of an oscillation having an angular frequency.

$$\omega_1'=\frac{1}{L'_sC_1}$$

Just after ¼ of a period of this oscillation the voltage $V_s$ passes through zero and will then assume a negative value. At the instant at which the voltage $V_s$ passes the value $-V_b/n$, the diode D becomes conductive. This instant is indicated in FIGURE 3 by $t_1$. As a result the source 1' is effectively connected in parallel with the coil $L'_s$, so that a linearly decreasing current $i_s$ will flow through the said coil, the slope of which is determined by $V_b/nL'_s$. The electrical energy which was accumulated in the capacitor $C_1$ at the instant $t=0$, is converted, during the flyback period 0 to $t_1$ into magnetic energy stored in the coil $L'_s$ and in the field of the transformer 2 of FIG. 1 replaced by the equivalent circuit of FIGURE 2. During the period $t_1$ to $\tau$ this magnetic energy is recovered as a current $i_s$ in the source 1', which, in fact, forms part of the actual source 1. From this it follows that the reactive energy is supplied through the supply coil $L_1$, is passed through the transistor T and is recovered through the diode D.

At the instant $t_1$ the transistor T must be cut off by the pulsatory signal 7 since the diode D with a current $n.i_d$ should be capable of taking over the transistor current $i_T$. Since the transistor T is cut off and the diode D is conducting at the instant $t_1$, it will be clear that the diode current $n.i_d=i_1+i_s$. Since before the instant $t_1$ it held that $i_T=i_1+i_s$, it follows that at the instant $t_1$, then $i_T=n.i_d$ will hold. This is shown in FIGURE 3*c* in which, in addition to the solid-line curve which represents the current $i_s$, the current $i_T$ for the period $0-t_1$ and the current $n.i_d$ for the period $t_1$ to $\tau$ is indicated in broken lines.

Although the currents $i_T$ and $n.i_d$ are equal at the taking-over instant $t_1$, the current $i_T$ has to be reduced to zero in a very short time and the current $n.i_d$ has to increase from zero to the required peak value in the same short time. In this case, fast switching requirements are imposed, in particular on the diode D. If D is a germanium or a silicon diode the inertia of the material also plays a role as a result of which the sawtooth current is distorted at the beginning of the stroke period. Since the transistor also cannot immediately be made non-conductive at the instant $t_1$ by means of the pulsatory signal 7 due to the "hole storage effect," the current $i_T$, if the diode current $n.i_d$ does not increase in a stepwise manner, will overswing, as a result of which the current $i'_s$ through the coil $L'_s$ will vary as indicated by the dot-and-dash line in FIGURE 3*c*.

Figure 4:
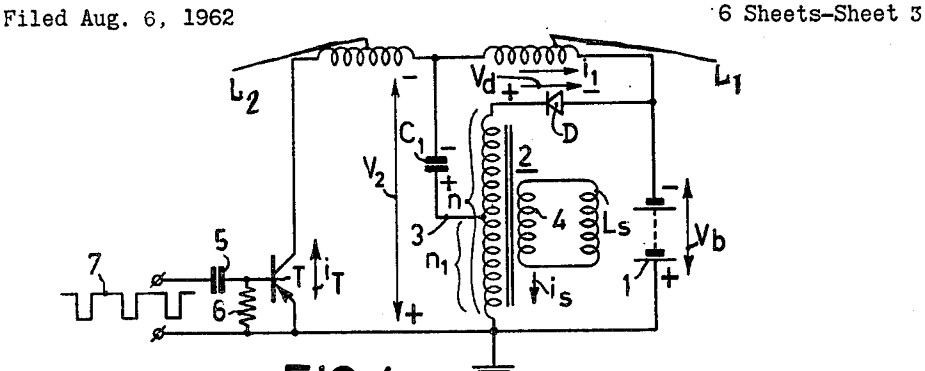
FIGURE 4 is a particular embodiment of a circuit according to the invention having a transistor as the switching device.

In order to avoid this disadvantage the invention includes the provision of an overswing coil $L_2$ connected between the junction point of the supply coil $L_1$ and the capacitor $C_1$, and the collector of transistor T as shown in FIGURE 4. It is possible by means of this overswing coil to control the taking-over of the transistor current by the diode current in a manner such that this taking-over takes place gradually and not abruptly. This may be explained with reference to FIGURE 5.

From the instant $t=0$ to $t=t_1$ the condition is substantially identical to that of the circuit arrangement shown in FIGURE 1, with the difference that the discharge of capacitor $C_1$ does not exclusively take place through the coil $L'_s$ since for the present case in the equivalent circuit diagram shown in FIGURE 2 the overswing coil $L_2$ must be connected between the junction point of the supply coil $L_1$ and the capacitor $C_1$, and the transistor T. In the case of a conductive transistor T and a cut-off diode D, the current $i_T$ (FIGURE 5*a*) through the transistor T will be given by $$i_T=\frac{P}{\omega_1 L_2}\sin\omega_1 t-\frac{V_b}{L_1+L_2}\cdot t \qquad (1)$$

where P is the amplitude of the sinusoidal current which depends upon the initial conditions at $t=0$ and in which $$\omega_1^2=\frac{1}{\left(L'_s+\frac{L_1+L_2}{L_1L_2}\right)C_1}$$

while for the circuit shown in FIGURE 1 the angular frequency $\omega^1{}_1$ for the period 0 to $t_1$ is exclusive determined by the coil $L'_s$ and the capacitor $C_1$. Since the period 0 to $t_1$ is the flyback period of the sawtooth current produced, and this flyback period substantially equals ¼ of a period of oscillations having an angular frequency $\omega'_1$ and $\omega_1$, $\omega_1$ (in the case of FIGURE 4) should be equal to the angular frequency $\omega'_1$ in the case of FIGURE 1. This may be readily achieved by altering the value of the capacitor $C_1$.

The same holds for the currents $i_s$ (FIGURE 5*b*) and $i_{C_1}$ (FIGURE 5*e*), while the current $i_1$ (FIGURE 5*c*) during this period will not be a linearly increasing current, but a sinusoidal current to which a linear component has been added. The current $n.i_d$ (FIGURE 5*d*) is zero, for the diode D is cut off.

During the period $t_1$ to $t_2$, however, quite different currents occur from those shown in FIGURE 3. For, at the instant $t=t_1$, the voltage at the cathode of the diode D also passes the value of $-V_b/n$ volts in the case of FIGURE 4, and the diode D will be rendered conductive. However, this does not imply that the transistor T must be non-conducting at the instant $t_1$ because the conductivity of diode D ensures that the voltage source 1' is connected in parallel with the coil $L'_s$ so that it is ensured that the current $i_s$ decreases linearly with time (FIGURE 5*b*). By including the coil $L_2$ in the circuit a new oscillatory circuit is formed comprising capacitor $C_1$ and the coils $L_1$ and $L_2$, so that the current $i_T$ during the period $t_1$ to $t_2$ will be of the form given by:

$$i_T=\frac{R}{\omega_2 L_2}\cos\{\omega_2(t-t_1)\}-\frac{V_b}{L_1+L_2}t \qquad (2)$$

where R is the amplitude of the sinusoidal current which is determined by the initial conditions at the instart $t=t_1$ and in which:

$$\omega_2^2=\frac{1}{C_1\left(\frac{L_1L_2}{L_1+L_2}\right)}$$

Therefore the current $i_T$ will decrease substantially sinusoidally and the currents $n.i_d$ and $i_1$ will increase substantially sinusoidally in a manner such that:

$$i_s=i_T+n.i_d-i_1$$

will linearly decrease at a rate determined by the slope of $V_b/n.L'_s$.

This is due to the fact that the overswinging of the current $i_T$ after the instant $t_1$ is not exclusively determined by capacitor $C_1$ and coil $L'_s$ but also by the overswing coil $L_2$. As seen from FIGURE 5*g*, in which the voltage $V_2$ across the series arrangement of the transistor T and the overswing coil $L_2$ is plotted, this voltage becomes positive after the instant $t_1$. The voltage at the cathode of the diode D, which, so long as it does not draw its required peak current would fall owing to the overswing effect without the coil $L_2$, is now maintained at a constant potential by the positive-going voltage $V_2$, so that the resulting current $i_s$ (FIGURE 5*b*) through the coil $L'_s$ will decrease linearly from the instant $t_1$ and will not overswing as the current $i'_s$ (FIGURE 3*c*).

Figure 5:
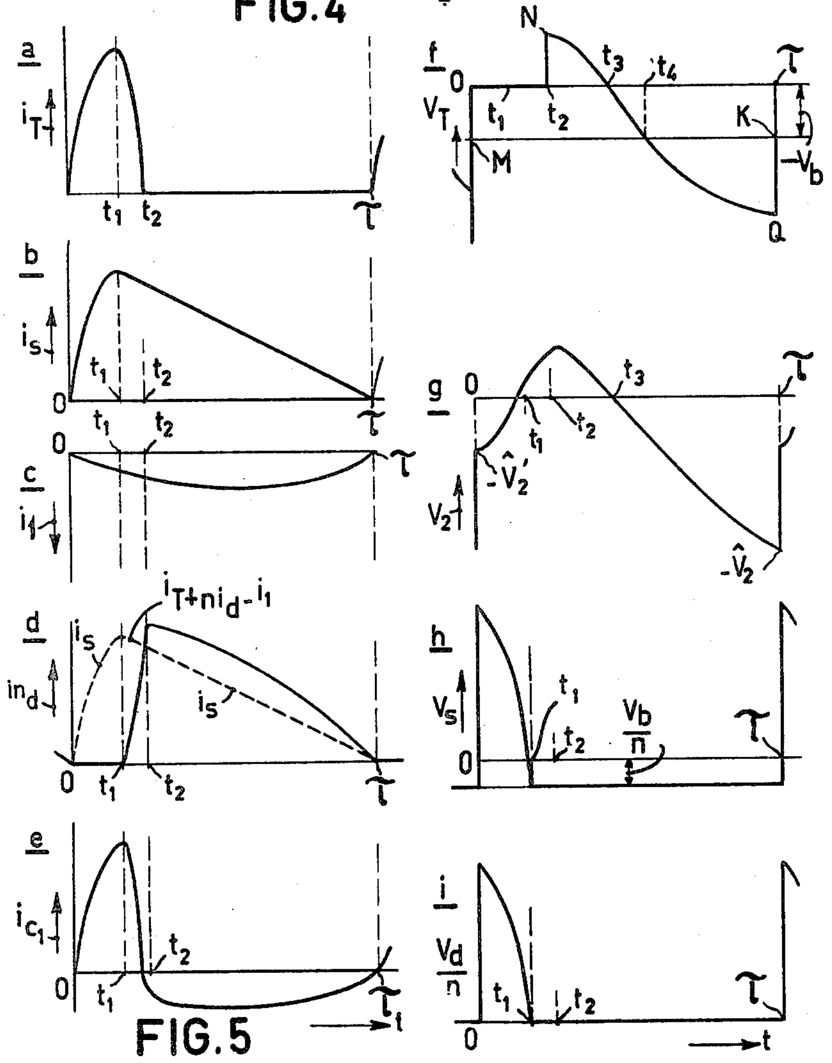
FIGURE 5 shows the currents and voltages as a function of time for the circuit arrangement shown in FIGURE 4.

At the instant $t_2$, the current $i_T$ through the transistor T becomes zero. If it is ensured that the control signal 7 renders the transistor T non-conductive so that after the instant $t_2$ no collector current can flow, the variation of the current after the instant $t_2$ will be as shown in FIGURE 5 and will be identical to those shown in FIGURE 3 for a corresponding period as the period $t_2$ to $\tau$ in FIGURE 5.

The switching of the transistor T may be reached by giving the pulses of the signal 7 a duration such that at the instant $t_2$ the concentration of minority carriers in the base region is removed. Since the period 0 to $t_1$ is substantially equal to ¼ of a period of the oscillation having angular frequency $\omega_1$ and the period $t_1$ to $t_2$ is substantially equal to ¼ of a period of an oscillation having angular frequency $\omega_2$ and the time for removing the minority carriers is known, the value of $L_2$ and the duration of the pulses of the signal 7 can be calculated. In any event ¼ of a period of the oscillation having angular frequency $\omega_2$ will have to be longer than the time required to remove the concentration of minority carriers in the base region since up till the instant $t_1$ the transistor T should be capable of passing enough collector current and consequently the removal may not be started before the instant $t_1$.

In the currents and voltages expressed as a function of time, shown so far, it is assumed that the supply coil $L_1$ has a comparatively small inductance value so that the current $$i_1=\int\frac{V_{L_1}}{L_1}dt$$

passing through it will vary as shown in FIGURES 3*d* and 5*c*. However, if the coil $L_1$ is given a large inductance value, theoretically an infinitely large value, $i_1$ becomes a constant current $$i_1=\int\frac{V_{L_1}}{\infty}dt=\int o\,dt=\alpha \text{ constant}$$

as shown in FIGURE 6*c*. Since at the instant $t=0$ both the transistor current and the diode current are zero, it follows that $i_s=i_1$, so that the current $i_s$ will have the form as shown in FIGURE 6*b*. All this has the advantage that the direct current component of the current $i_s$ has become smaller than for the examples shown in FIGURES 3 and 5. Since, the coil $L_s$ is coupled via the transformer 2, a decrease of the direct current component will provide a decrease of the pre-magnetization of the core material of the transformer 2. Consequently, the greater the inductance of the supply coil $L_1$, the more economically can the transformer 2 be proportioned.

Figure 6:
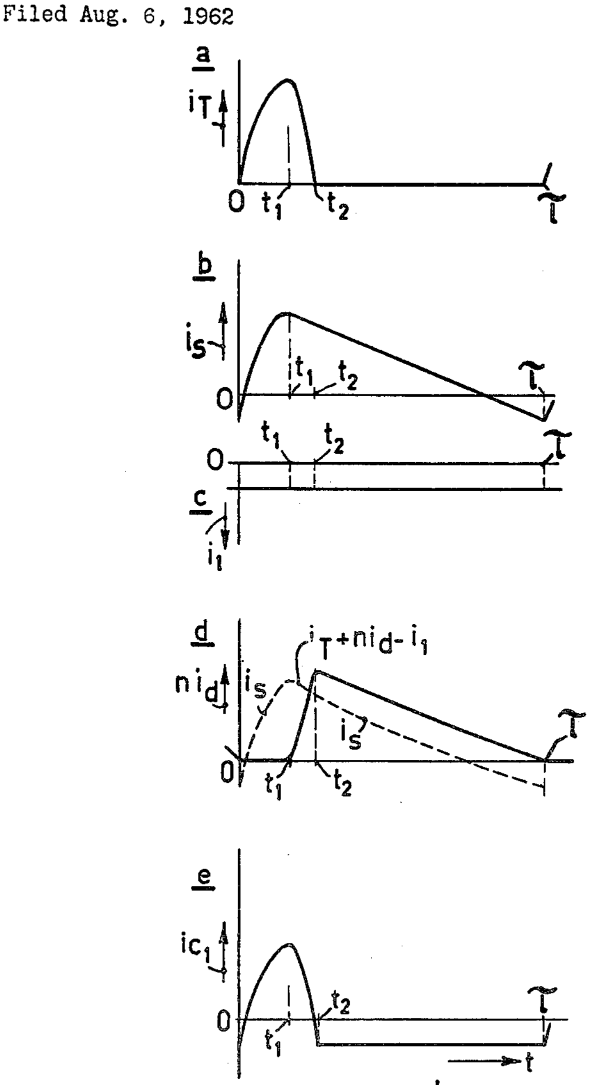
FIGURE 6 shows the currents as a function of time for the circuit arrangement shown in FIGURE 4, wherein the supply coil has a very large inductance.

For $L_1=\infty$, the currents $i_T$, $n.i_d$, and $i_{C_1}$ are shown in FIGURES 6*a*, 6*d* and 6*e* and the differences between the currents which occur for a large or for a small inductance value of the supply coil $L_1$ are apparent by comparing FIGURES 5 and 6.

Although when using a transistor T as a switching element a considerable improvement is obtained, in connection with the taking over of the current of the diode D, by providing the overswing coil $L_2$, a disadvantage arises in that the control of transistor T becomes more critical. For, in the circuit shown in FIGURE 4, the most favourable condition is that at the instant $t_2$ the concentration of minority carriers in the base region is removed since $i_T=0$. This imposes high requirements upon the duration of the pulses of the control signal 7 and, in addition, the characteristics of the transistors used should be uniform otherwise the value of the angular frequency $\omega_2$ would have to be calculated for each transistor seperately. Because the properties of transistors vary considerably the obtaining of uniform characteristics is generally impossible.

Figure 7:
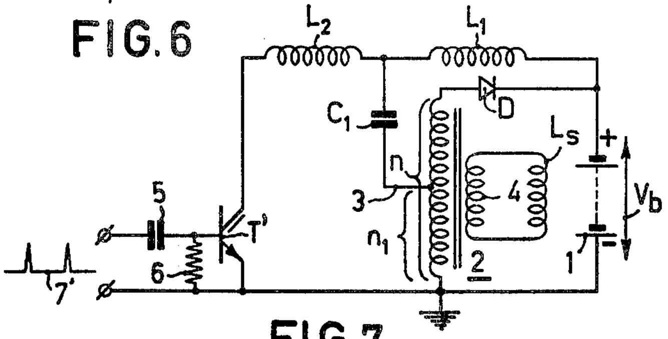

All these drawbracks can be avoided if, according to a further aspect of the flyback-driven circuit according to the invention, the switching device is an SCR. This is shown in FIGURE 7, in which the device T′ represents the SCR. In FIGURE 7, the SCR T′ is of npnp construction in which the emitter part *e* consists of *n*-material, the base part *b* of *p*-material and the collector part *c* also of *p*-material. A layer consisting of *n*-material is provided between the collector and the base. The current in such an SCR is directed from the collector *c* to the emitter *e* and its symbol is shown in FIGURE 7*a*. If a npnp SCR T′ is used, the positive terminal of the voltage source 1 may be connected through the coils $L_1$ and $L_2$ to the collector *c* and the negative terminal to the emitter *e* of the thyristor T′. The diode D in this case must be connected as shown in FIGURE 7.

Alternatively a pnpn SCR may be used. In this type of SCR the current flows from the emitter *e* to the collector *c*. Its symbol is shown in FIGURE 7*b*. If a pnpn type SCR is used in the circuit shown in FIGURE 7, the polarity of the source 1 and that of the diode D must be reversed.

As is known, an SCR may be made conductive by applying pulses of short duration (positive pulses for a npnp-thyristor and negative pulses for a pnpn-thyristor) to its base *b*. The signal 7′ applied may therefore consist of short-duration pulses, the duration of which may be small with respect to the period 0 to $t_1$.

The cutting off of the SCR T′ in the circuit arrangement in accordance with the invention now occurs fully automatically. As is known an SCR which is conductive can no longer be cut off by a pulse applied between the base and the emitter even if said pulse has a polarity opposite to that which made the SCR conductive. It is possible however to supply a negative pulse to the collector of a npnp-thyristor after it has been made conductive which pulse cuts off the thyristor and keeps it cut off until, by the co-operation of the control signal 7 at the base *b* and the negative voltage at the collector *c* of the thyristor, both the concentration of minority carriers in the actual base region and in the so-called second base region, namely the *n*-material between the actual base *b* and the collector *c*, have been removed for the greater part. This can be better accomplished when the voltage between the base and the emitter is more strongly negative during the time that the collector voltage is negative with respect to the emitter. In addition, if the voltage at the collector becomes positive again the base current must remain so large that when the collector voltage reverses no collector current can flow, which means that the base current should only be capable of removing the remaining minority carriers in this new condition.

This result is realized in the circuit shown in FIGURE 7. To explain this, reference is made to the circuit of FIGURE 4 for which the currents and voltage are shown in FIGURE 5. For example, in FIGURE 5*g* the voltage $V_2$ is shown, namely the voltage across the series arrangement of the transistor T and the overswing coil $L_2$. At the end of the stroke period, namely at the instant $\tau$, the voltage $V_2$ equals $-\hat{V}_2$. If the external signal 7 renders the transistor T conductive (instant $t=0$) the end of the coil $L_2$ connected to the collector is connected to earth. The voltage $V_2$ consequently falls by steps to the value $-\hat{V}_2$ and will further gradually decrease according to the formula:

$$V_2=-P\cos\omega_1 t-\frac{L_2}{L_1+L_2}V_b \qquad (3)$$

where P and $\omega_1$ are the same quantities as in Formula 1. Just before the instant $t_1$, the voltage $V_2$ passes the zero value and will consequently overswing until the voltage at the cathode of the diode D reaches the value $-V_b/n$. The capacitor $C_1$ is also included in this oscillatory circuit and it charges to $V_{C_1}=V_2-V_s$ so that if $V_s$ and $V_2$ pass through zero (FIGURES 5*g* and 5*h*), $V_{C_1}$ also has to pass through zero and will then overswing to a voltage of opposite polarity. In this manner $V_2$ overswing to a positive value and $V_s$ to a negative value until the previous value of $-V_b/n$ volts is reached. At the instant $t_1$, the diode D becomes conductive, but, owing to the presence of the coil $L_2$, the voltage $V_2$ overswings according to the formula:

$$V_2=R\sin\{\omega_2(t-t_1)\}-\frac{L_2}{L_1+L_2}V_b \qquad (4)$$

where $\omega_2$ and R are the same quantities as in Formula 2. The voltage $V_2$ overswings in a positive direction until at the instant $t_2$ the collector current through the transistor T becomes zero and the transistor itself is cut off by the action of the control signal 7. The voltage $V_T$ across the transistor T at the instant $t_2$ will consequently assume the same value as the voltage $V_2$. Then, the voltage $V_T=V_2$ overswings according to the formula:

$$V_T=V_2=\omega_3 L_1 S\cos\{\omega_3(t-t_2)\}-V_b \qquad (5)$$

where S is an amplitude which is dependent upon the initial conditions at the instant $t_2$ and in which $$\omega_3^2=\frac{1}{L_1C_1}$$

At the instant $t=\tau$, the voltage $V_2$ again reaches the value $-V_2$, which may be approximately three times as large as the supply voltage $-V_b$. For, the mean value of the voltage at the collector of the transistor T is $V_b$ volts, so that the voltage $V_T$ must oscillate around the mean value $-V_b$. From this it follows that the area $O\tau KM$ must be equal to the area $t_3Q\tau$ decreased by the area $t_2Nt_3$ (see FIGURE 5*f*). At the instant $t=\tau$ the cycle is repeated.

From FIGURES 5*f* and 5*g* it follows that the transistor voltage $V_T$ becomes positive during the period $t_2$ to $t_3$.

In the circuit shown in FIGURE 7, the polarity of the voltage source 1 is reversed and, consequently, also the currents and voltages in FIGURE 5 must be reversed. From this it follows that the collector voltage of the SCR T′ is negative during the period $t_2$ to $t_3$. As a result of this the current through the SCR T′ after the instant $t_2$ can become equally negative which strongly accelerates the removal of the concentration of minority carriers from the two base regions. The control signal 7′ is applied through the capacitor 5 and will oscillate about earth potential at the base *b*. This means that each time shortly after the occurrence of a positive pulse which renders the SCR T′ conductive the base will become negative with respect to the emitter. A larger negative base voltage also promotes the said removal of the concentration of minority carriers and, in addition, the larger this negative voltage the better it is ensured that, after the instant $t_3$, the base current can remove the rest of the minority carriers. Consequently, the larger the negative base voltage the smaller period $t_2$ to $t_3$ can be to ensure that from the instant $t_3$ to the instant $\tau$ the SCR T′ can no longer pass collector current. Since the period $t_2$ to $t_3$ is substantially determined by the angular frequency $\omega_3$ the period $t_2$ to $t_3$ is established by the choice of $L_1$ and $C_1$ and it may be ensured that the SCR is cut off and remains cut off from the instant $t_2$—$\tau$ by adapting the amplitude of the signal 7′ to it. The amplitude of the control signal 7′ is not critical since, the greater the amplitude the sharper the switching and the better the SCR T′ remains cut off during the period $t_2$ to $\tau$.

Thus the circuit arrangement of FIGURE 7 is entirely self-operating apart from the action of the control pulses 7′ which determine when the SCR T′ is made conductive. The ideal condition is that in which the instant $\tau$ always coincides with the beginning of a positive pulse. However, in the case of a line deflection circuit in a television receiver the pulses 7′ are obtained from an oscillator which is synchronized by the line synchronizing pulses. It will be clear that this ideal condition, when changing the frequency of the line synchronizing pulses, cannot be maintained. This is no drawback if it is ensured that the period of the signal 7′ is always less than, or, at most, equal to the period 0 to $\tau$ determined by the circuit of FIGURE 7. For, if the period of the signal 7′ were longer than the period 0 to $\tau$ the diode current $n.i_d$ would always be zero before the SCR T′ again became conductive. From this it follows that the sawtooth current $i_s$ would be distorted and this is obviously undesirable.

If, on the contrary, the period of the signal 7′ is chosen to be somewhat less than the period 0 to $\tau$ the SCR T′ will conduct before the diode current $n.i_d$ has reduced to zero. As a result of this the amplitude of the current $i_s$ will also become somewhat less but the mechanism of the deflection will not be disturbed.

It will be clear that the circuits according to the embodiments given need not always be used. For example the circuits described in FIGURES 5 and 6 of British patent specification 815,411 can be improved in accordance with the invention by providing an overswing coil between the supply coil and the switching element T or T′.

Nor need the primary of the transformer 2 and the capacitor $C_1$ always be connected in series. Alternatively a circuit as shown in FIGURE 8 may be used. In this circuit electrical energy is accumulated in the capacitor $C_1$ from the source 1 via the supply coil $L_1$. During the flyback period the SCR T′ is made conductive by the signal 7′ and the electrical energy of the capacitor $C_1$ is converted into magnetic energy accumulated in the field of the transformer 2 and the coil $L_s$. In series with the winding $n_1$ of the transformer 2 the overswing coil $L_2$ is provided which ensures that the current through the primary circuit can gradually reduce to zero after the diode D has been made conductive. Also the current $i_T$ through the SCR (current produced by the field during the period $t_1$ to $t_2$) gradually, decreases and the diode current $n.i_d$ gradually increases, while their sum which flows through the deflection coil $L_s$ is linear with respect to time owing to the fact that the diode D, when conducting, connects the source 1 through the secondary $n$ of the transformer 2.

The deflection coil $L_s$ in the example shown in FIGURE 8 is coupled through a capacitor 8 in order to remove the direct current component from the deflection current. Alternatively the coil $L_s$ could also be coupled through a tertiary winding to the transformer 2 in order to remove the D.C. component.

In the example shown in FIGURE 8 the overswing coil $L_2$ is provided as a separate coil but the desired effect may also be obtained without a separate coil. This is possible, for example, by ensuring that the transformer 2 has an internal leakage inductance which is sufficient to replace the coil $L_2$ in the circuit diagram of FIGURE 8. This may be realised by winding the primary $n_1$ of the transformer 2 on the core such that part of the primary flux is not coupled to the secondary. The leakage inductance of the secondary winding, however, must be very small otherwise it cannot be said that the source 1 is only connected through the diode D across the coil $L_s$. The foregoing can be realised by connecting the deflection coil $L_s$ through the capacitor 8 across the whole secondary $n$. The transformer ratio $n_1/n$, however, is substantially determined by the ratio between the stroke period and the flyback period since the diode D must remain conductive until the end of the stroke period (condition for equilibrium between charging and discharging of capacitor $C_1$).

The slope of the sawtooth current through the coil $L_s$ in the case of FIGURE 8 equals $V_b/L_s$. However, if $L_s$ does not have the exact inductance value and if, for example, its value is less than that required for the correct slope of the sawtooth current, the said current may be given the correct slope by connecting the coil $L_s$ to a tapping of the secondary $n$ through the capacitor 8. In this case the leakage inductance between the said tapping and the junction point of the diode D with the transformer 2 should be taken into account.

In order to ensure the desired overswinging and to ensure that the leakage inductance does not distort the sawtooth current, the overswing coil $L_2$ should be provided in a manner as shown in FIGURE 9. The inductance of the coil $L_2$ should also be equal to $S_2/n-1$, if $S_2$ is the inductance of the leakage inductance between the tapping 9 to which the capacitor 8 is connected, and the junction point of the diode D with the transformer 2. By the use of this proportioning a sawtooth current will flow through the coil $L_s$ as can be demonstrated by means of the partial equivalent circuit diagram of FIGURE 10. This diagram holds for the period $t_1$ to $t_2$, during which period the current $i_{C_1}$ through the capacitor $C_1$ will decrease sinusoidally and flow to the overswing coil $L_2$ through the still conductive SCR T′ and back to the capacitor $C_1$ through transformer 2. Transformer 2 may be shown with a leakage inductance $S_1$, namely the leakage inductance between the tapping 3 and the capacitor $C_1$ and the leakage inductance $S_2$ between the tapping 9 and the junction point with the diode D, to which junction point the coil $L_s$ also is transformed which is indicated in FIGURE 10 as coil $L''_s$. The source 10 represents an equivalent current source which supplies the sinusoidal capacitor current $i_{C_1}$. In addition, in FIGURE 10 the coils $S_2$ and $L_2$ are connected together, since the diode D is conductive for the period $t_1$ to $t_2$ and the source 1 for the sinusoidal current $i_{C_1}$ is assumed to have zero impedance. In addition, $n_1=1$ is assumed so that the current $i_{C_1}$ of the source 10 divides into a current $i_{C_1}/n$ through the winding between the tapping 3 and the leakage inductance $S_2$ and a current $i_{C_1}\cdot(1-1/n)$ through the winding between the tapping 3 and the overswing coil $L_2$. By making the voltage drop as a result of the current $i_{C_1}\cdot(1-1/n)$ through the coil $L_2$ equal to the voltage drop across the leakage inductance $S_2$ through which the current $i_{C_1}/n$ flows, it may be ensured that no voltage is set up across the coil $L''_s$ caused by the sinusoidal current $i_{C_1}$. This is achieved if, as already indicated $L_2=S_2/n-1$. Since the currents $i_{C_1}/n$ and $i_{C_1}\cdot(1-1/n)$ flow through the transformer winding with opposite polarities, and are inversely proportional to the number of turns through which they flow, their influences just neutralize one another so that the magnetic field of transformer 2 will not contain a sinusoidal compound. The current $i_s$ through the coil $L''_s$ will consequently depend exclusively on the voltage $V_b$ supplied by the source 1 and will consequently be substantially sawtooth-shaped.

If the coil $L_s$ has an inductance value which is larger than is required for the exact slope if the capacitor 8 would immediately be connected to the anode of the diode D, it will be clear that the same compensation measures can be taken if the coil $L_s$ is connected to an extended winding of the secondary through the capacitor 8 instead of to a tapping.

Finally, FIGURE 11 shows a circuit which may be considered to be a variation of the circuit shown in FIGURE 1. This circuit which operates in exactly the same manner as the circuit shown in FIGURE 7 is provided with a recovery capacitor 11 across which a voltage $V_B$ is developed so that the total supply voltage for the circuit is equal to $V'_b+V_B$.

The capacitor 11 is made sufficiently large such that the voltage $V_B$ developed across it does not substantially vary as a result of the charging and discharging current flowing through it and takes the place of the D.C. voltage source 1 of FIGURE 7, so that the D.C. voltage source 12 which supplies a voltage of $V'_b$ volts serves exclusively for replacing the losses occurring in the circuit. Therefore, the capacitor 11 may be considered as an auxiliary D.C. voltage source.

The operation of the overswing coil $L_2$ provided in accordance with the invention is the same as that in the circuit shown in FIGURE 7.

The circuit shown in FIGURE 11 is only attractive when SCR's are used. The SCR can stand far higher voltages in the cut off condition than transistors so that its use is attractive for higher voltage sources 12.

What is claimed is:

1. A circuit for producing a sawtooth current having a sweep period and a flyback period in a first inductance, comprising a source of direct voltage, impedance means, a capacitor, means for connecting said impedance means and said capacitor in a series circuit across said voltage source, switch means, a second inductance connected in series with said switch means, means for closing said switch means during said flyback period thereby to periodically discharge said capacitor into said first inductance through a current path comprising the series combination of said switch means and said second inductance, and means for maintaining the voltage across said first inductance substantially constant during said sweep period comprising a rectifier element connected to said first inductance and means for applying a bias voltage to said rectifier, said rectifier being poled to conduct during said sweep period.

2. A circuit for producing a sawtooth current in an inductance having a sweep period and a flyback period, comprising a source of direct voltage, impedance means, a capacitor, means for connecting said impedance means and said capacitor in a series circuit across said voltage source, switch means comprising a silicon-controlled rectifier having an input circuit comprising base and emitter electrodes and an output circuit comprising collector and emitter electrodes, an inductive impedance connected in series with said switch means, means for periodically connecting said inductance in parallel with said capacitor during said flyback period, said connecting means comprising said series combination of switch means and inductive impedance and further comprising means for closing said switch means during said flyback period, said means for closing comprising means for applying a pulse signal to said input circuit to render said controlled rectifier conductive at the beginning of the flyback period, said inductive impedance being connected in said output circuit between said collector and emitter electrodes and having a voltage induced therein by current flow in said controlled rectifier of a polarity to cut-off said controlled rectifier during the initial portion of the sweep period, said controlled rectifier being held cut-off during the sweep period by the combined effect of said pulse signal at the input circuit and the frequency-determining elements in the output circuit of said controlled rectifier, and means for maintaining the voltage across said inductance substantially constant during said sweep period comprising a rectifier element connected to said inductance and to said voltage source and poled to conduct during said sweep period.

3. A circuit for producing a sawtooth current having a sweep period and a flyback period in a deflection coil, comprising a transformer having winding means to which said deflection coil is coupled, a source of direct voltage, a first inductance, a capacitor, means continuously connecting said first inductance and said capacitor in series to said voltage source, switch means, a second inductance, means connecting said capacitor, said transformer winding means, said second inductance and said switch means in a closed loop, means for periodically closing said switch during said flyback period thereby to discharge said capacitor through said winding to store magnetic energy in the field thereof, a rectifier element, and means serially connecting said rectifier and winding means to a source of voltage, said rectifier being poled in the reverse direction with respect to said last-named voltage source whereby said rectifier conducts during said sweep period.

4. A circuit for producing a sawtooth current having a sweep period and a flyback period in a deflection coil, comprising a transformer having a primary winding and a secondary winding to which said deflection coil is coupled, a source of direct voltage having first and second terminals, a first inductance, a capacitor, means connecting said first inductance, said capacitor and said primary winding in series with said voltage source wherein said first inductance is connected between said first terminal of said voltage source and a first terminal of said capacitor, the second terminal of said capacitor being connected through said primary winding to the second terminal of said voltage source, switch means, a second inductance connected in series circuit with said switch means, means connecting the series arrangement of switch means and second inductance between said first terminal of said capacitor and said second terminal of said voltage source, means for periodically closing said switch during said flyback period thereby to discharge said capacitor through said switch and said primary winding, a diode, and means serially connecting said diode and said secondary winding across said voltage source, said diode being poled to conduct during the sweep period.

5. A circuit for producing a sawtooth current having a sweep period and a flyback period in a deflection coil, comprising a transformer having a primary winding and a secondary winding to which said deflection coil is coupled, a source of direct voltage, a supply impedance, a capacitor, means serially connecting said supply impedance and capacitor across said voltage source, switch means, an inductance, means connecting said switch means, inductance and primary winding in a series circuit, means connecting said series circuit in parallel with said capacitor, means for periodically closing said switch during said flyback period thereby to discharge said capacitor through said series circuit, a diode, and means serially connecting said diode and secondary winding across said voltage source, said diode being poled to conduct during the sweep period.

6. A circuit for producing a sawtooth current having a sweep period and a flyback period in a deflection coil, comprising a transformer having a core and a primary and secondary winding wound thereon, said transformer being arranged so that a portion of the primary winding flux is not coupled to said secondary winding thereby producing an internal leakage inductance therein, means coupling said deflection coil to said transformer secondary winding, a source of direct voltage, a supply impedance, a capacitor, means serially connecting said supply impedance and capacitor across said voltage source, semiconductor switch means, means connecting said semiconductor switch means and said primary winding and the said leakage inductance in a series circuit, means connecting said series circuit in parallel with said capacitor, means for periodically closing said semiconductor switch during said flyback period thereby to discharge said capacitor through said series circuit, a diode, and means serially connecting said diode and said secondary winding across said voltage source, said leakage inductance having an inductance value so as to form an L–C resonant circuit with said capacitor which produces a voltage overswing at said semiconductor switch means at the beginning of the sweep period of a polarity to cut-off said semiconductor switch means whereby the current flow through said switch means decreases sinusoidally to zero and simultaneously a current flows through said diode which increases sinusoidally from zero to a given value, said diode being poled in the reverse direction with respect to said voltage source whereby said diode conducts during the sweep period to supply a substantially constant voltage across said secondary winding.

7. A circuit for producing a sawtooth current having a sweep period and a flyback period in a deflection coil, comprising a transformer having a primary and a secondary winding each of which has a pair of terminals, a source of direct voltage having first and second terminals, a supply impedance, an inductance, a capacitor having first and second terminals, means connecting said supply impedance, capacitor, inductance, and primary winding in series across said voltage source wherein said supply impedance is connected between said first terminal of the voltage source and said first terminal of the capacitor, a diode, means connecting said diode between said first terminal of the voltage source and a first terminal of said secondary winding, said diode being poled to conduct during the sweep period, means connecting said second terminal of the capacitor to a first terminal of said primary winding, means connecting the other terminal of said primary winding directly to the other terminal of said secondary winding, means connecting said inductance between the connected terminals of said primary and secondary windings and said second terminal of the voltage source, switch means connected between said first terminal of the capacitor and said second terminal of the voltage source, means for periodically closing said switch during said flyback period thereby to discharge said capacitor, a second capacitor connected in series circuit with said deflection coil, and means connecting said last-named series circuit between said other terminal of said secondary winding and a tap on said secondary winding such that the effective inductance of said coil is increased to the value required to produce a predetermined slope of said sawtooth current in said coil, said inductance having a value which satisfies the formula $L_2=S_2/n-1$, wherein $S_2$ is the leakage inductance of said transformer between said secondary winding tap and said first terminal of said secondary winding, and $n$ is the turns ratio of the transformer windings.

References Cited by the Examiner

UNITED STATES PATENTS

| | | | |
|---|---|---|---|
| 2,797,358 | 6/1957 | Gargini | 315—27 |
| 2,896,115 | 7/1959 | Guggi | 315—27 |
| 2,995,679 | 8/1961 | Skoyles | 315—29 |

DAVID G. REDINBAUGH, *Primary Examiner.*